United States Patent
Kaiser

[11] 3,844,752
[45] Oct. 29, 1974

[54] METHOD FOR FABRICATING AN OPTICAL FIBER CABLE

[75] Inventor: Peter Kaiser, Middletown, N.J.

[73] Assignee: Bell Telephone Laboratories, Incorporated, Murray Hill, N.J.

[22] Filed: Aug. 20, 1973

[21] Appl. No.: 389,481

[52] U.S. Cl.............. 65/4, 65/DIG. 7, 350/96 WG
[51] Int. Cl.......................... C03c 23/20, G02b 5/14
[58] Field of Search................... 65/3, 4, DIG. 7; 350/96 WG; 264/1

[56] References Cited
UNITED STATES PATENTS

| | | | |
|---|---|---|---|
| 2,608,722 | 9/1952 | Stuetzer | 65/DIG. 7 |
| 3,387,959 | 6/1968 | Cole | 65/4 |
| 3,455,666 | 7/1969 | Bazinet, Jr. | 65/4 |
| 3,615,313 | 10/1971 | Phaneuf | 65/DIG. 7 |
| 3,677,730 | 7/1972 | Deradourian et al. | 63/DIG. 7 |
| 3,684,468 | 8/1972 | Bode et al. | 65/DIG. 7 |

*Primary Examiner*—S. Leon Bashore
*Assistant Examiner*—Frank W. Miga
*Attorney, Agent, or Firm*—D. I. Caplan

[57] ABSTRACT

In order to fabricate a number of multimode single material optical fibers in a single cable, an array of both hollow thin-walled glass tubes and solid glass rods of the same material are placed within the cable to provide the preform assembly for a multiple-core fiber cable. An optical waveguide is formed by each solid rod being supported within the hollow cable by the adjacent hollow tubes. Thereby, each core in the final structure is capable of supporting multimode optical propagation.

6 Claims, 3 Drawing Figures

PATENTED OCT 29 1974 3,844,752

3,844,752

METHOD FOR FABRICATING AN OPTICAL FIBER CABLE

Field of the Invention

This invention relates to the field of optical communications systems, and more particularly to methods for fabricating optical fiber structures.

BACKGROUND OF THE INVENTION

In the prior art, optical waveguides in the form of optical fibers have been utilized for the propagation of optical wave energy in a single mode, or in multimodes, from one location to another, typically separated by large distances of the order of a kilometer. A basic problem arises in these optical fibers involving the need for surrounding the core of the fiber with "cladding" material, which is required for electromagnetic guidance as well as mechanical support and protection, along the whole length of the optical fibers. In particular, at the juncture of the cladding with the optical fiber core, an optical disturbance or perturbation is typically introduced in the modes of optical wave energy being transmitted through the fiber. This perturbation causes various problems in the propagation of the electromagnetic signal wave energy, such as the unwarranted conversion of signal energy from one mode to another mode, with consequent optical energy loss and distortion problems. Another problem arises from the cladding material surrounding the central core of optical fibers. Such cladding must ordinarily be made of a material having a lower optical refractive index than that of the core. However, for such desirable core materials as fused silica, it is difficult to find correspondingly suitable cladding which has a lower refractive index than that of the core and, at the same time, presents sufficiently low optical absorption loss to make the fiber commercially attractive. Moreover, ordinarily this cladding material obstructs any coating of the optical fiber core with various optical materials which could serve to provide purposeful interaction with the signal wave energy propagating through the optical fiber.

As more fully discussed in an article by P. Kaiser, E. A. J. Marcatili and S. E. Miller, 52(2) Bell System Technical Journal (BSTJ), February 1973, pp. 265-269 (having an author in common with the inventor herein), single material optical fibers possess certain advantages. Those fibers each consisted of a single fiber optic material which has a solid central portion which is mechanically supported by one or more thin supporting members of the same single transparent material fused to the central portion. Briefly, the advantages of those single material fibers include freedom from the need for a lower refractive index cladding material and hence freedom from optical energy losses ordinarily caused by this cladding, as well as freedom from the obstruction of such cladding which blocks off any external access to the propagating optical radiation in the fiber, such access being desirable for interacting with the signal along the fiber transmission path. It would be desirable, for the purpose of facilitating the splicing process especially in case of multiple path optical transmission, to have a simple method for fabricating a closely packed plurality of single material optical fibers for providing many independent optical waveguides situated in well-defined relative positions in a single cable enclosure.

SUMMARY OF INVENTION

An array of mutually parallel tubes and rods are placed in mutual contact within an enclosure, thereby forming a preform assembly for an optical fiber cable. The rods and tubes advantageously consist of the same optical fiber material having a spatially uniform refractive index. In accordance with the invention, the preform includes both hollow tubes and solid rods. After the preform assembly is heated and drawn (pulled longitudinally), each of the solid rods forms a separate optical waveguide fiber core while the hollow tubes provide mechanical support for these cores in the enclosure.

In a specific embodiment of the invention, a rectangularly cross-sectional tubular enclosure of fused silica is filled with an array of tubes and rods. Whereas the solid rods and the hollow tubes should be made advantageously from high-grade fused silica material, the enclosure can consist of low-grade fused quartz. The hollow tubes could also contain regions of doped fused silica for the purpose of suppressing undesired crosstalk between neighboring waveguide cores in the finished cable. The enclosure and the array of tubes and rods therein are heated and drawn longitudinally, in order to fuse the adjacent tubes and rods together as well as to the enclosure, and in order to increase the length of the cable (thereby reducing the cross section). In this way, the drawn assembly provides a multicore optical waveguide cable containing as many cores as solid preform rods in the original array (before drawing), each core supported and maintained rigidly in place in the cable by the (formerly) hollow tubes.

BRIEF DESCRIPTION OF THE DRAWING

This invention, together with its features, advantages, and objects, can be better understood and appreciated from the following detailed description in which.

For the purpose of clarity only, the drawings are not to scale.

DETAILED DESCRIPTION

Figure 1:
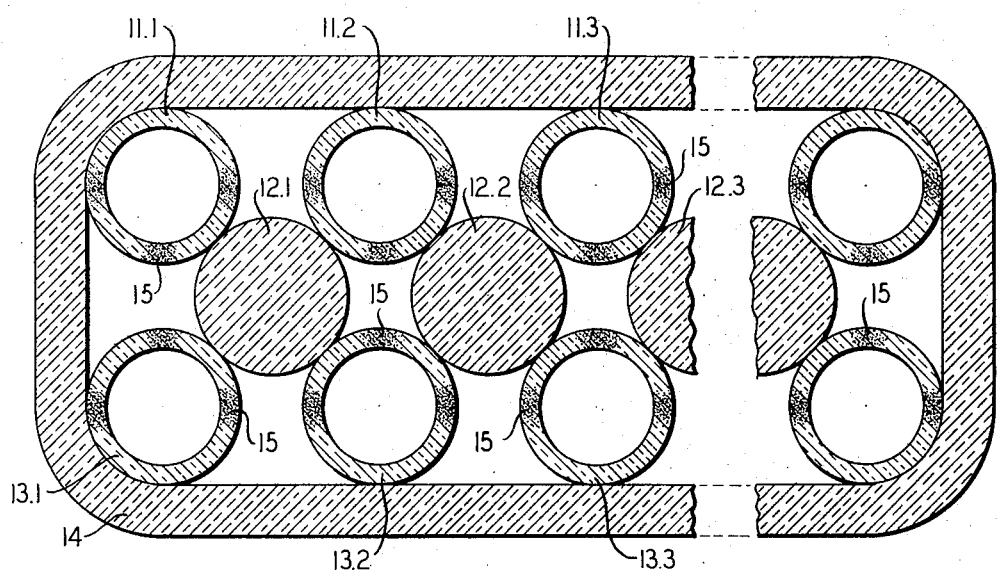
FIG. 1 shows a preform assembly, in cross section, of an optical fiber cable in accordance with a specific embodiment of the invention.

As shown in FIG. 1, an optical fiber cable preform assembly 10 includes a hollow tubular enclosure preform 14 containing a first row of hollow tube preforms 11.1, 11.2, 11.3 . . ., a second row of solid rod preforms 12.1, 12.2, 12.3 . . ., and a third row of hollow tube preforms 13.1, 13.2, 13.3 . . .. The second row of solid rod preforms thereby forms a first plurality of solid optical fiber preforms; whereas the first and third rows of hollow tube preforms thereby form a second plurality of hollow optical fiber preforms, whereby each of the solid rod preforms is contacted by some of the hollow tube preforms. Advantageously, all the hollow preforms are made of optically transparent fused silica in the form of circularly cylindrical hollow tubes, while all the solid preforms are made of optically transparent fused silica in the form of solid circularly cylindrical rods. The hollow tubes, in addition, may optionally contain optically absorbing portions 15, typically of doped (tinted) fused silica, in order to prevent crosstalk in the final optical fiber device between neighboring optical cores (to be formed from the solid preforms 12.1, 12.2 . . .) in case the naturally occurring exponential decay of optical mode intensity in the hollow tubes between the solid rods is otherwise not sufficient to prevent such crosstalk. The enclosure 14 advantageously contains the hollow and solid circular preforms in the close-pack mutually contacting arrangement shown in FIG. 1, in which each solid rod is contacted by four hollow tubes.

Figure 2:
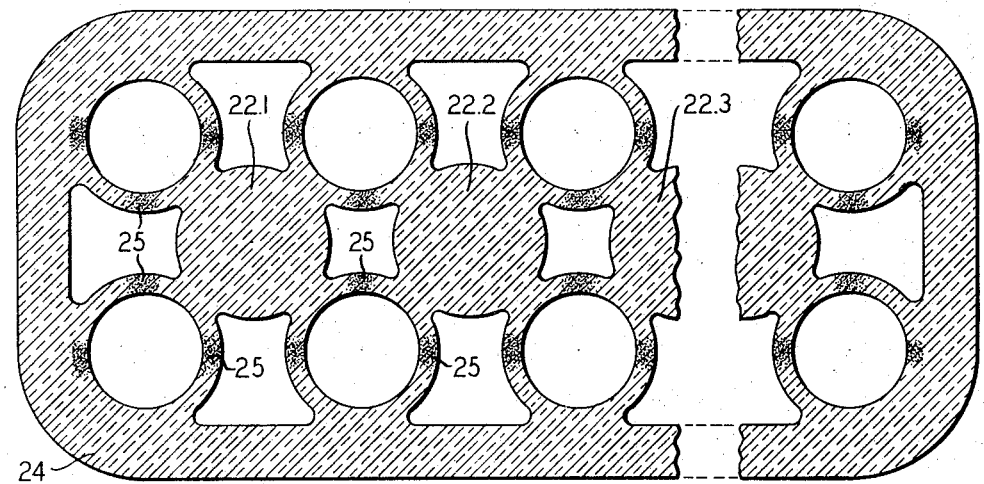
FIG. 2 shows an optical fiber cable, in cross section, as fabricated in accordance with a specific embodiment of the invention.

In order to form an optical fiber cable device 20, suitable for transmitting optical beams over large distances, the preform assembly 10 is heated to a temperature sufficient both for fusing the various contacting preform elements together and for drawing the preform in the longitudinal direction (parallel to the axis of the cylindrical preforms) to a suitable final length and cross section. Thereby, and as shown in FIG. 2, the final optical fiber cable device 20 includes central cores 22.1, 22.2, 22.3 . . ., serving as optical fiber waveguides which are mechanically supported in place by the previous hollow cylindrical tubes which are now fused both to the tubular enclosure portion 24 as well as to the next neighboring solid cores 21.1, 21.2, 21.3 . . . In addition, it should be noted that if originally tinted portions 15 were used, they will persist as tinted portions 25, and will be located in appropriate positions to prevent optical crosstalk between neighboring cores either directly between neighboring cores themselves or indirectly through the cable enclosure 24.

By way of illustration only, in a typical example, for propagating optical radiation of a wavelength of about one micron, each of the solid cores has a final diameter of approximately 20 microns in radius with a distance between centers of next neighboring cores of about 60 microns. In addition, the overall width in the horizontal direction (FIG. 2) of the enclosure 24 can be in the range between about 160 microns (for a single core) to about 1 millimeter (for many cores), with a height in the vertical direction of about 160 microns. In this way the supporting slablike portions of the device 20, for connecting the central cores to the enclosure, will be characterized by a length of about 20 microns, with a thickness of about 2.0 to 2.5 microns. In order to obtain these typical dimensions for the final device 20, the solid preforms 12.1, 12.2, 12.3 . . . all have an outside diameter of about 2 millimeters, whereas the hollow preforms 11.1, 11.2, 11.3 . . . and 13.1, 13.2, 13.3 . . . all have an outside diameter of about 3 millimeters with a 0.15 millimeter wall thickness. The cable enclosure preform 14 typically has a width in the horizontal direction of about 22 millimeters for a six-core fiber cable, and a height in the vertical direction of about 10 millimeters, with a wall thickness of about 2 millimeters. The tinted portions 15 typically are formed by doping the fused silica in the appropriate regions of the hollow cylindrical preforms with such impurities as iron, vanadium and cobalt. These regions 15 are located (at least three to a hollow cylinder) mutually spaced apart at central angles of about 90°.

Figure 3:
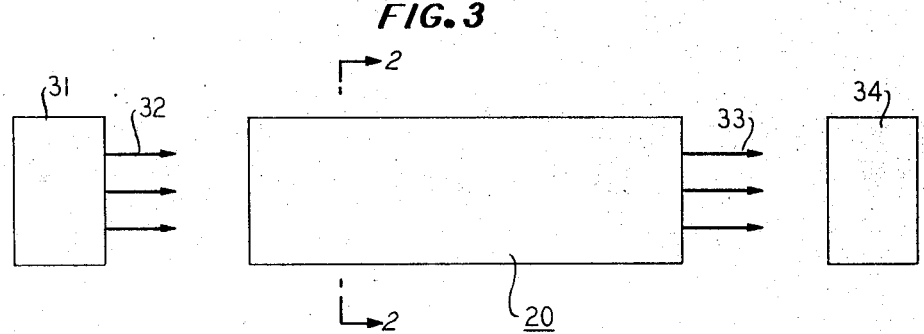
FIG. 3 shows an optical communication system utilizing the optical fiber cable of FIG. 2.

As shown in FIG. 3, the optical fiber cable device 20 can be utilized in an optical communication system formed by an optical source 31, which produces an incident input optical beam 32 incident upon the device 20, all of which provides an exit output optical beam 33 incident upon utilization means 34 which, in turn, utilizes and processes the information contained in the output optical beam 33. It should be understood of course that the input beam 32 contains many individually controllable (as to information content, as by intensity modulation) cross-sectional portions, each of which is incident on a different one of the solid fiber cores 22.1, 22.2, 22.3 in the optical fiber cable device 20. Thereby, the output beam 33 will be a faithful representation of the cross-sectional portions of the input beam 32 in accordance with known fiber optic principles, particularly in view of the aforementioned paper of P. Kaiser, E. A. J. Marcatili and S. E. Miller. Briefly, each of the optical fiber cores 22.1, 22.2 . . . transmits the optical radiation incident upon it from the input (left-hand) end to the output (right-hand) end of each such fiber without much loss into the optical absorbing portions 25, due to the relatively thin (as compared with the diameter of the cores) portions of the supporting members formed of the original hollow tubular preforms.

Although this invention has been described in detail with reference to a particular embodiment, it should be obvious that many modifications can be made without departing from the scope of the invention. For example, instead of the three-row array shown in FIG. 1 in a close-pack formation, other types of arrays are possible, particularly with the aid of indentations (grooves) running longitudinally along the inside wall of the enclosure preform 14, in order to hold securely in place the hollow preforms during assembly and during the drawing (pulling) operation to form the final optical fiber device from the preform assembly. In addition, other optical fiber materials than fused silica may be used, particularly those which can be relatively easily fused together and longitudinally drawn to form the final optical cable device. For example, such materials as multicomponent glasses or plastics can also be used for the optical fiber in this invention.

What is claimed is:

1. The method of making an optical cable which comprises the steps of:
   a. placing an array of a first plurality of substantially identical transparent solid optical fiber preforms and a second plurality of substantially identical hollow optical fiber preforms in an enclosure preform, each of said solid preforms being contacted by some of said hollow preforms and each of the solid preforms being of essentially the same optical fiber preform material as the material of the hollow preforms in their neighborhoods contacting it, to form a preform assembly of the enclosure preform and of the fiber preforms in a predetermined geometric cross-sectional pattern relationship;
   b. heating the preform assembly to a predetermined temperature suitable for drawing the assembly longitudinally to increase the length of the fibers; and
   c. longitudinally drawing the preform assembly to a predetermined length, whereby each solid preform provides a core for optical waveguide propagation.

2. The method of claim 1 in which the solid fiber preforms are solid circular cylinders and the hollow fiber preforms are hollow circular cylinders.

3. The method of claim 2 in which the hollow fiber preforms contain optically absorbing portions and in which the remainder of these hollow preforms are essentially of the same material as that of the solid fiber preforms.

4. The method of claim 1 in which the array comprises three rows of fiber preforms, the top and bottom rows being all of hollow preforms, and the intermediate row being all of solid preforms.

5. The method of claim 4 in which the fiber preforms have circularly cylindrical outside walls.

6. The method recited in claim 1 in which each of said solid preforms is being contacted by at least four of said hollow preforms.

* * * * *